(12) United States Patent
Kaneko et al.

(10) Patent No.: US 6,242,882 B1
(45) Date of Patent: *Jun. 5, 2001

(54) MOTOR CONTROL APPARATUS

(75) Inventors: Satoru Kaneko, Urizura-machi; Ryozo Masaki, Hitachi, both of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/444,567

(22) Filed: Nov. 19, 1999

Related U.S. Application Data (63) Continuation of application No. 09/081,763, filed on May 21, 1998, now Pat. No. 6,005,365.

(51) Int. Cl.[7] .................................................. H02P 1/46
(52) U.S. Cl. ......................... 318/700; 318/727; 318/809; 318/608; 318/799
(58) Field of Search .................................. 318/700, 727, 318/809, 608, 799

(56) References Cited

U.S. PATENT DOCUMENTS 4,006,977 * 2/1977 Harrow et al. ...................... 318/700
6,005,365 * 12/1999 Kaneko et al. ...................... 318/700

FOREIGN PATENT DOCUMENTS 7-245981    9/1995 (JP) .

* cited by examiner

*Primary Examiner*—Karen Masih
(74) *Attorney, Agent, or Firm*—Evenson, McKeown, Edwards & Lenahan, P.L.L.C.

(57) ABSTRACT

The present invention addresses a problem as to how to provide a motor control apparatus which has a magnetic pole position inferring means capable of inferring the position of a magnetic pole of a synchronous motor by adopting a simple method in a short period of time with a high degree of accuracy. In order to solve this problem, a signal id1* for inference use is applied and a peak value iqh of a response current iq' is detected by an iq' peak detecting unit. The peak value iqh is then supplied to a magnetic pole position inferring unit for inferring the position of the magnetic pole of the synchronous motor by carrying out multiplication processing.

2 Claims, 12 Drawing Sheets

MOTOR CONTROL APPARATUS

This application is a continuation of application Ser. No. 09/081,763, filed May 21, 1998 now U.S. Pat. No. 6,005,365.

BACKGROUND OF THE INVENTION

The present invention relates to a motor control apparatus for inferring the position of a magnetic pole of a synchronous motor rotor and controlling the synchronous motor in accordance with the inferred position of the magnetic pole.

A conventional technology adopted in a motor control apparatus for inferring the position of a magnetic pole of a synchronous motor is disclosed in Japanese Patent Laid-open No. Hei 7-245981.

According to description in Japanese Patent Laid-open No. Hei 7-245981, a component of a current vector or a voltage vector parallel and perpendicular to an alternating voltage vector or an alternating current vector applied to a salient pole synchronous motor is detected, from at least one of the components, a phase difference angle formed by the applied vector and a magnetic flux axis is calculated and the position of a magnetic pole is inferred from the calculated phase difference angle.

This technique offers the benefit that the position of a magnetic-pole can be inferred without letting the synchronous motor generate a torque since the alternating voltage is applied to the magnetic flux axis.

SUMMARY OF THE INVENTION

However, the prior art described above has the following problem.

In the technology disclosed in Japanese Patent Laid-open No. Hei 7-245981, an alternating voltage vector or an alternating current vector is applied to an orthogonal axis coordinate system having two axes perpendicular to each other set in a motor control apparatus, a current vector or a voltage vector generated thereby is detected and the position of a field pole is computed. Formulas used in the computation are based on voltage/current equations of the synchronous motor, requiring operations such as differentiation and division. As a result, the computation time is very long and, in addition, deterioration of accuracy in the inference of the position of the magnetic pole due to parameter errors is conceivable.

It is thus an object of the present invention to provide a motor control apparatus having a means for inferring the position of a magnetic pole of a synchronous motor with a high degree of accuracy by adopting a simple method, that is, a method that allows the means to infer a position in a short period of time.

In order to achieve the object of the present invention described above, there is provided a motor control apparatus having a magnetic pole position inferring means for inferring the position of a magnetic pole of a synchronous motor by applying an alternating-current (AC) current signal for inference use or an AC voltage signal for inference use in the direction of one of two mutually perpendicular axes of an orthogonal axis coordinate system and detecting a current or a voltage in the direction of the other of the two mutually perpendicular axes, wherein the magnetic pole position inferring means infers the position of the magnetic pole by using a value of the current or the voltage detected with timing of a predetermined phase with respect to the AC current signal for inference use or the AC voltage signal for inference use. In addition, the object of the present invention can also be achieved by detecting the current or the voltage for each half period of the AC current signal for inference use or the AC voltage signal for inference use and inferring the position of the magnetic pole from the quantity of changes in the detected value.

Also, in order to achieve the object of the present invention described above, there is further provided another motor control apparatus having a magnetic pole position inferring means for inferring the position of a magnetic pole of a synchronous motor by applying an AC current signal for inference use or an AC voltage signal for inference use in the direction of one of two mutually perpendicular axes of an orthogonal axis coordinate system and detecting a current or a voltage in the direction of the other of the two mutually perpendicular axes, wherein the magnetic pole position inferring means corrects a set value of the position of the magnetic pole in accordance with a result of the multiplication of the current or the voltage in the direction of the other of the two mutually perpendicular axes by a predetermined gain. On top of that, the object of the present invention can also be achieved by correcting a set value of the position of the magnetic pole in accordance with a result of carrying out proportional and integral or proportional, integral and differential processing on the current or the voltage in the direction of the other of the two mutually perpendicular axes.

BRIEF DESCRIPTION OF THE DRAWINGS

Embodiments of the present invention will be described by referring to the following diagrams wherein.

DETAILED DESCRIPTION OF THE PREFERRED EMBODIMENTS

The present invention will become more apparent from a careful study of the following detailed description of some preferred embodiments of the invention with reference to the accompanying diagrams.

First of all, the description begins with the principle of a technique of inferring the position of a magnetic pole of a synchronous motor by applying an AC current signal for inference use or an AC voltage signal for inference use in the direction of one of two mutually perpendicular axes of an orthogonal axis coordinate system and detecting a current or a voltage in the direction of the other of the two mutually perpendicular axes.

The following description explains only the principle of a technique of inferring the position of a magnetic pole of a synchronous motor by applying an AC current signal for inference use in the direction of one of two mutually perpendicular axes of an orthogonal axis coordinate system and detecting a current in the direction of the other of the two mutually perpendicular axes. It should be noted that the position of a magnetic pole can be inferred by embracing the principle of a technique of applying a voltage as is the case with the technique of applying a current.

The one of the mutually perpendicular axes oriented in the direction of the magnetic pole of the synchronous motor is referred to as a d axis and the other of the mutually perpendicular axes oriented in the direction of a magnetic flux is known as a q axis.

In the first place, a voltage equation of a salient pole synchronous motor (that is, Ld described below is not equal to Lq also described below) is expressed by Eq. (1) as follows:

$$\begin{bmatrix} vd \\ vq \end{bmatrix} = \begin{bmatrix} R+pLd & -\omega Lq \\ \omega Ld & R+pLq \end{bmatrix} \begin{bmatrix} id \\ iq \end{bmatrix} + \begin{bmatrix} 0 \\ \omega \phi a \end{bmatrix} \quad (1)$$

where symbols vd and vq (=vd) are voltages in the directions of the d and q axes respectively, symbols id and iq (=id) are currents in the d and q axes respectively, a symbol R is the resistance of an armature winding, symbols Ld and Lq are inductances in the directions of the d and q axes of the synchronous motor respectively, a symbol ω is the frequency of the synchronous motor, a symbol oa is a field main magnetic flux and a symbol p is a differential operator.

In a halted state, the synchronous motor frequency ω=0 and Eq. (1) can thus be rewritten into Eq. (2) as follows:

$$\begin{bmatrix} vd \\ vq \end{bmatrix} = \begin{bmatrix} R+pLd & 0 \\ 0 & R+pLq \end{bmatrix} \begin{bmatrix} id \\ iq \end{bmatrix} \quad (2)$$

Figure 18:
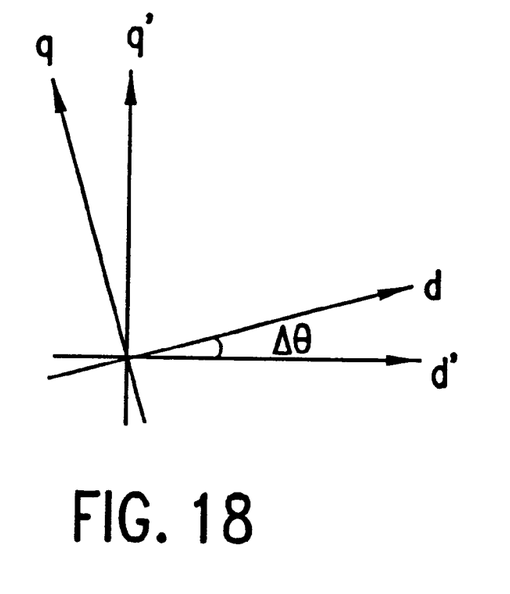
FIG. 18 is a diagram showing a position error between d and q axes of the synchronous motor and d' and q' axes of a control coordinate system.

When there is a position error Δθ between the d and q axes of the synchronous motor and d' and q' axes of a control coordinate system as shown in FIG. 18, Eq. (3) given below represents a voltage equation expressing a relation between applied voltage commands vd* and vq* in the directions of the d' and q' axes respectively of the control coordinate system and response current values id' and iq' in the directions of the d' and q' axes respectively.

$$\begin{bmatrix} vd^* \\ vq^* \end{bmatrix} = \begin{bmatrix} (R+pLd)(\cos\Delta\theta)^2 + (R+pLq)(\sin\Delta\theta)^2 & \frac{1}{2}p(Ld-Lq)\sin 2\Delta\theta \\ \frac{1}{2}(Ld-Lq)\sin 2\Delta\theta & (R+pLd)(\sin\Delta\theta)^2 + (R+pLq)(\cos\Delta\theta)^2 \end{bmatrix} \begin{bmatrix} id' \\ iq' \end{bmatrix} \quad (3)$$

In addition, taking a current control system into consideration, the applied voltage commands vd* and vq* in the directions of the d' and q' axes respectively can be expressed by Eq. (4) as follows:

$$\begin{bmatrix} vd^* \\ vq^* \end{bmatrix} = \begin{bmatrix} kd & 0 \\ 0 & kq \end{bmatrix} \begin{bmatrix} id^* - id' \\ iq^* - iq' \end{bmatrix} \quad (4)$$

where symbols kd and kq are current control constants.

Substitution of Eq. (4) for the applied voltage commands vd* and vq* in Eq. (3) and rearrangement of the result of the substitution yield lead, a transfer function from applied current commands id* and iq* in the directions of the d' and q' axes respectively of the control coordinate system to response current values id' and iq' in the directions of the d' and q' axes respectively as shown by Eq. (5) as follows.

$$\begin{bmatrix} vd' \\ vq' \end{bmatrix} = \begin{bmatrix} G11 & G12 \\ G21 & G22 \end{bmatrix} \begin{bmatrix} id^* \\ iq^* \end{bmatrix} \quad (5)$$

For the current command iq* in the direction of the q axis equal to 0 (iq*=0) representing a case in which only a current command id* in the direction of the d axis is applied as a command, the transfer function of Eq. (5) is reduced to G21 which represents a transfer function from the applied current command id* in the direction of the d axis of the control coordinate system to the response current value id' in the direction of the d' axis as shown by Eq. (6) as follows:

$$G21 = \frac{kd \cdot p(-Ld + Lq)\sin 2\Delta\theta}{2kd \cdot kq + (pLd + pLq + 2R)(kd + kq) + 2p^2 Ld \cdot Lq + 2R(pLd + pLq + R) + (pLq - pLd)(kd - kq)\cos 2\Delta\theta} \quad (6)$$

It is obvious from Eq. (6) that, if there is no position error $\Delta\theta$ between the d and q axes of the synchronous motor and the d' and q' axes of the control coordinate system, no current iq' is generated. If a position error $\Delta\theta$ exists, on the other hand, the current iq' is generated even if a command is given to only the current id* by setting the current iq* at 0.

Thus, by utilizing this principle, that is, by giving a high frequency command to only the current id* and correcting a phase so as to make the current iq' equal to 0, the position of the magnetic pole can be inferred.

In this case, a signal for inference use is applied to the current command id* in the direction of the d axis and the position of the magnetic pole is inferred from a detected value of the current iq' in the direction of the q axis. It should be noted that, the position of the magnetic pole can also be inferred from a detected value of the current id' in the direction of the d axis which is generated by applying a signal for inference use to the current command iq* in the direction of the q axis.

The description given above explains the principle of a method of inferring the position of a magnetic pole of a synchronous motor by applying an AC current signal for inference use or an AC voltage signal for inference use in the direction of one of two mutually perpendicular axes of an orthogonal axis coordinate system and detecting a current or a voltage in the direction of the other of the two mutually perpendicular axes. The following is a description of the substance of the present invention for implementing the method of inferring the position of a magnetic pole of a synchronous motor described above with a high degree of accuracy by adopting a simple technique of computation.

The following description explains a method of inferring the position of a magnetic pole whereby a current signal id1* for inference use is applied to the current command id* in the direction of the d axis and the position of the magnetic pole is inferred from a detected value of the current iq' in the direction of the q axis. It should be noted that, the principle of the method can also be adopted for a case in which the position of the magnetic pole is inferred from a detected value of the current id' in the direction of the d axis which is generated by applying a signal for inference use to the current command iq* in the direction of the q axis. As an alternative, the method can also be applied to a system in which voltages are used in place of the currents.

Figure 1:
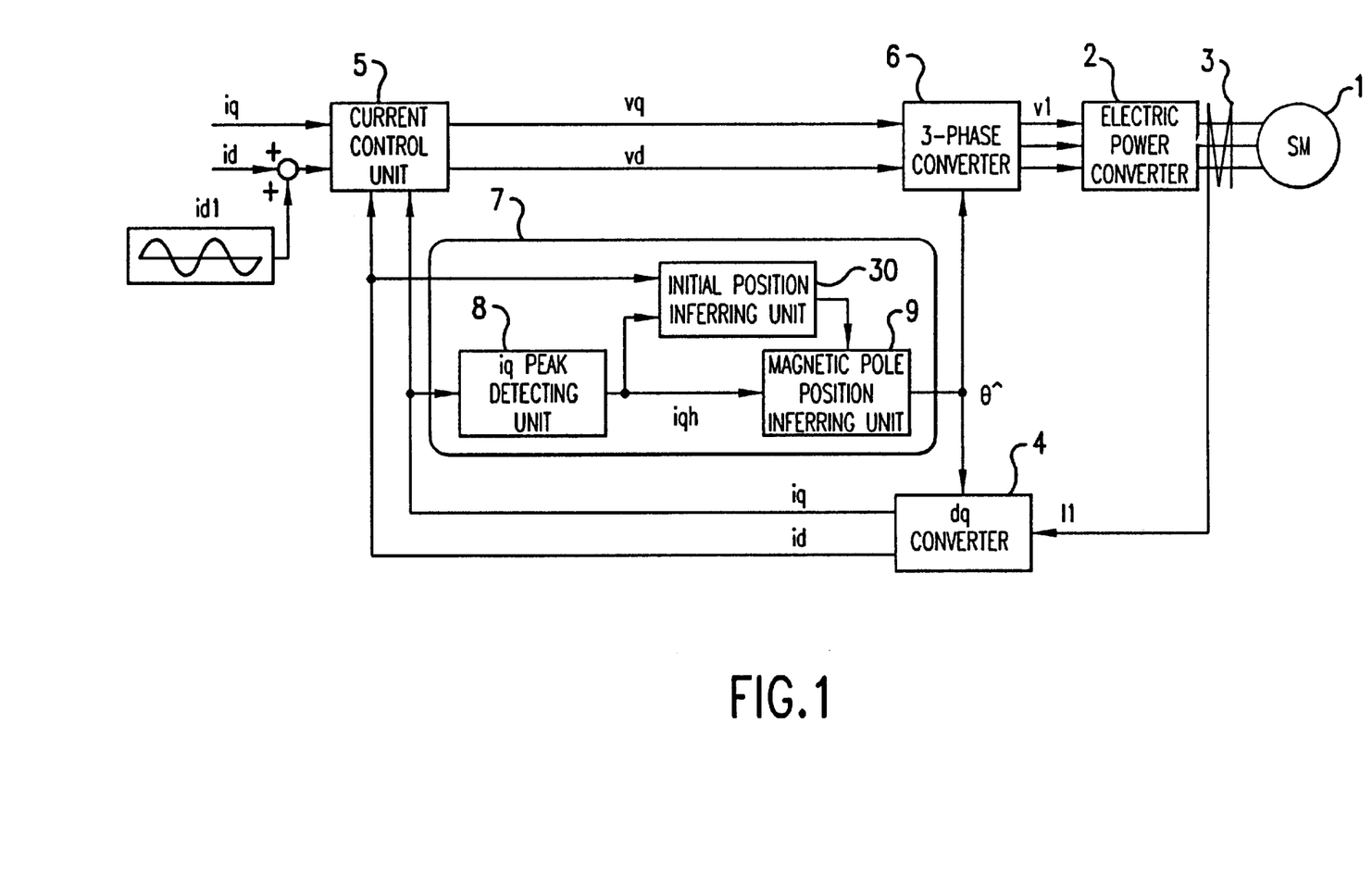
FIG. 1 is a block diagram showing the configuration of a system for inferring the position of a magnetic pole of a synchronous motor by detecting a peak value of a response current iq' which detected peak value is used in the inference.

First of all, a first embodiment implementing a motor control apparatus is explained by referring to FIG. 1.

FIG. 1 is a block diagram showing the configuration of a motor control apparatus adopting a method for inferring the position of a magnetic pole of a synchronous motor by detecting a peak value of a response current iq' and using the detected peak value in the inference of the position.

As shown in the figure, the motor control apparatus comprises a synchronous motor 1, an electric power converter 2 for generating AC voltages by conversion of a 3-phase input voltage command V1*, a current detector 3, a dq converter 4 for converting a synchronous motor current I1 detected by the current detector 3 into response currents id' and iq' in the directions of the d' and q' axes in dq conversion based on an inferred value $\theta^{\wedge}$ of the position of the magnetic pole, a current control unit 5 for generating voltage commands vd* and vq* in the directions of the d and q axes respectively so that detected values of the currents id' and iq' follow the current commands id* and iq* in the directions of the d and q axes respectively, a phase converter 6 for converting the voltage commands vd* and vq* on the d and q axes respectively into the 3-phase voltage command V1* in accordance with the inferred value $\theta^{\wedge}$ of the position of the magnetic pole and a magnetic pole position inferring means 7 for generating the inferred value $\theta^{\wedge}$ of the position of the magnetic pole.

Figure 16:
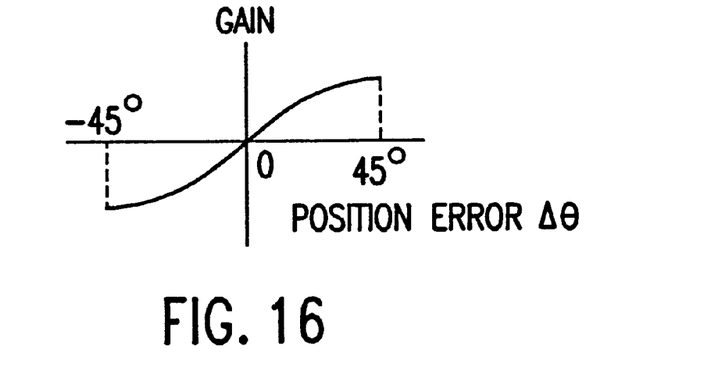
FIG. 16 is a diagram showing a characteristic curve representing a relation between the gain and the position error Δθ for the response current iq'.
Figure 17:
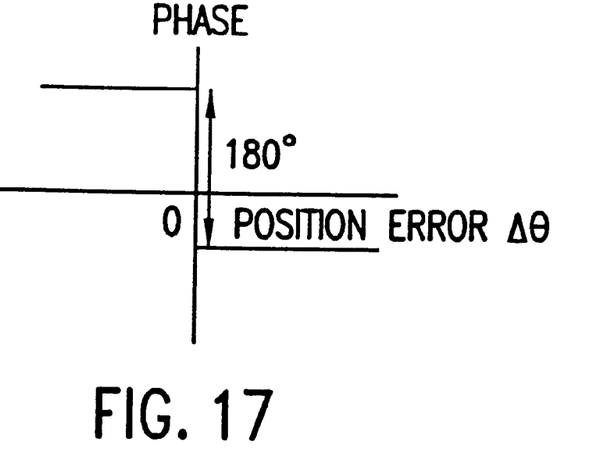
FIG. 17 is a diagram showing a characteristic curve representing a relation between the phase and the position error Δθ for the response current iq'.

FIG. 16 is a diagram showing a characteristic curve representing a relation between the gain and the position error $\Delta\theta$ for the transfer function expressed by Eq. (6) from the current command id* to the detected value of the current iq' while FIG. 17 is a diagram showing a characteristic curve representing a relation between the phase and the position error $\Delta\theta$ for the transfer function.

In the first place, as the position error $\Delta\theta$ increases, the gain of the detected value of the current iq' with respect to the current command id* also increases, reaching maximums at $\Delta\theta = \pm 45$ degrees as shown in FIG. 16. As for the difference in phase between the detected value of the current iq' and the current command id*, there are variations to a certain degree even though the variations are all but constant without regard to the magnitude of the position error $\Delta\theta$ and the phase of the difference is inverted by 180° as the sign of $\Delta\theta$ is changed as shown in FIG. 17.

It is thus obvious that, by using the gain and phase characteristics, if control is executed for a detected value of the current iq' obtained with predetermined phase timing with respect to the current command id*, the position error $\Delta\theta$ can be inferred. In the following description, the detected value of the current iq' is denoted by notation iqh.

The principle of the method of inferring the position of a magnetic pole is implemented by the magnetic pole position inferring means 7 employed in the motor control apparatus shown in FIG. 1.

It should be noted that with regard to the detected value iqh of the current iq' used in the inference, if the value is detected at such a predetermined phase that the current iq' reaches a peak, the inference can be carried out easily and with a higher degree of accuracy than other phase timing.

In the magnetic pole position inferring means 7 shown in FIG. 1, the value iqh is detected by an iq' peak detecting unit 8 and the detected value iqh is supplied to a magnetic pole position inferring unit 9 for computing an inferred value $\theta^{\wedge}$. At that time, the waveforms of a current signal id1* and the response current iq' are shown in FIG. 2.

Figure 2:
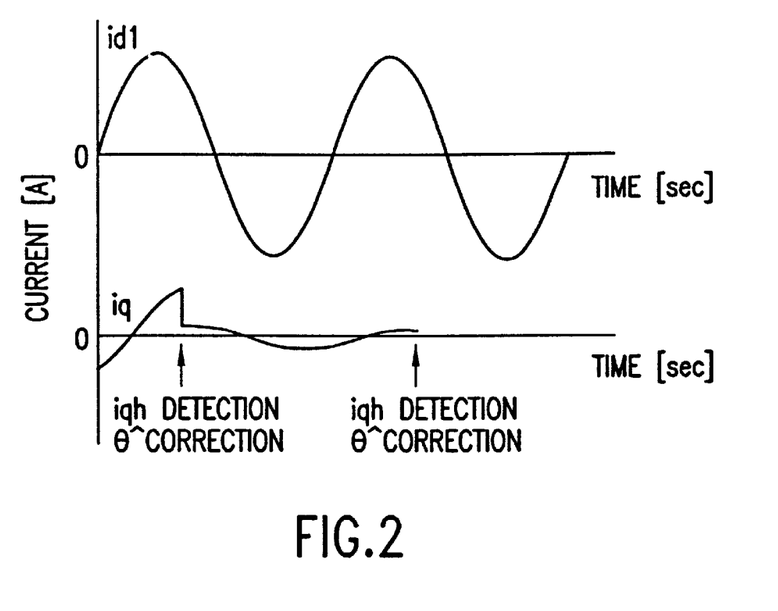
FIG. 2 is a diagram showing waveforms in a process of correcting a phase by detecting a peak value of a response current iq' and using the detected peak value in the correction.

As shown in FIG. 2, the peak value of the response current iq' which appears at a certain phase of the current signal id1* for inference use is detected and an inferred value $\theta^{\wedge}$ is corrected by using the detected value iqh. By executing control as described above, the amplitude of the response current iq' decreases, becoming 0 when the inferred value $\theta^{\wedge}$ matches the position $\theta$ of the magnetic pole of the synchronous motor 1.

By detecting the value of the current iq' with certain phase timing of the current signal id1* for inference use, the position of the magnetic pole can be inferred with ease.

As described above, the motor control apparatus adopts an inference method whereby a value iqh is detected at such a phase that the response current iq' reaches a peak. It should be noted that the phase timing for detection is not specially limited to such a peak. Instead, the phase timing can be any phase as long as the timing does not coincide with a point in time at which the response current iqu becomes 0.

Figure 3:
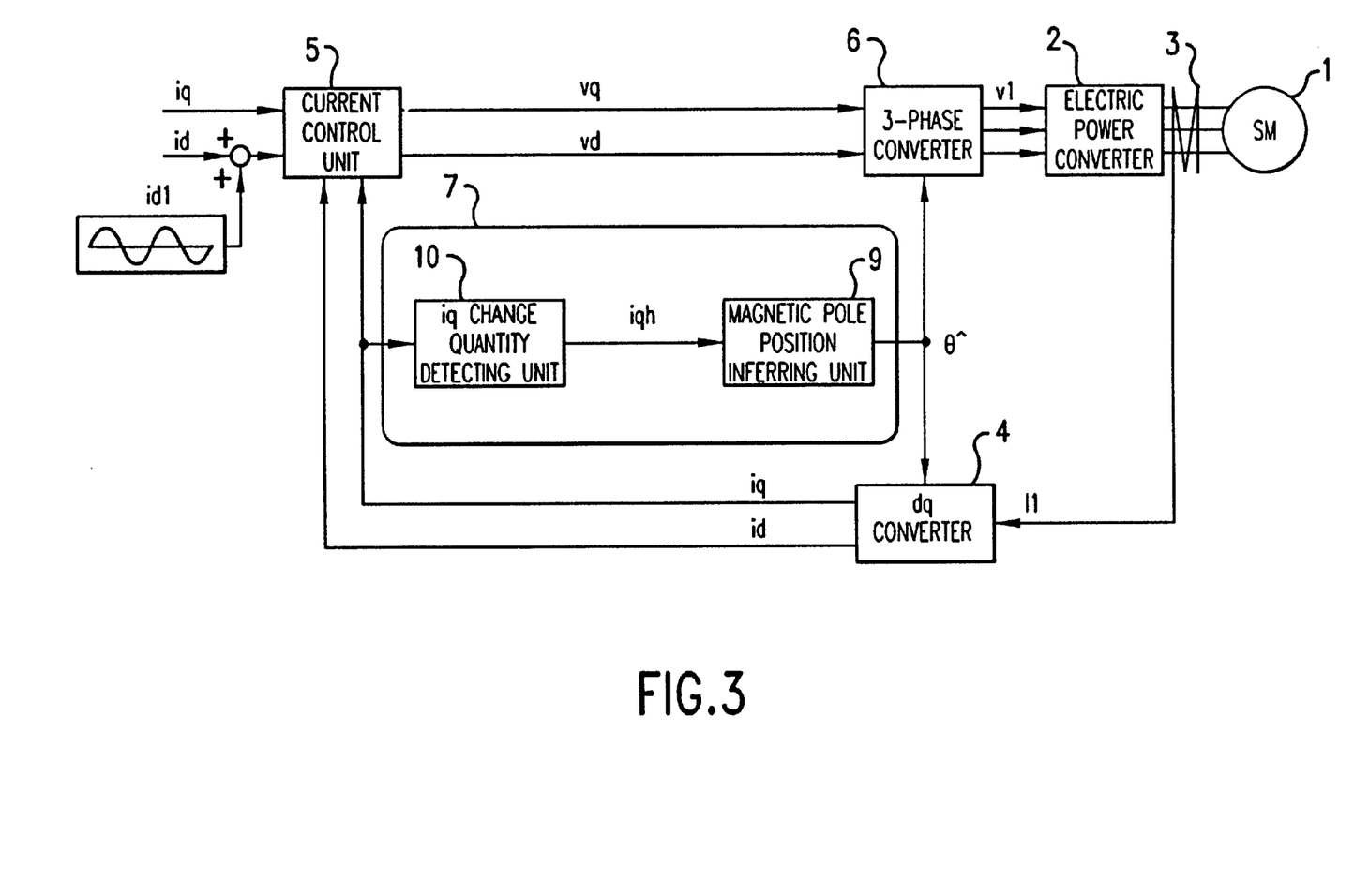
FIG. 3 is a block diagram showing the configuration of a system for inferring the position of a magnetic pole of the synchronous motor by detecting the quantity of a change generated in a half cycle of the response current iq' which detected quantity of the change is used in the inference.
Figure 4:
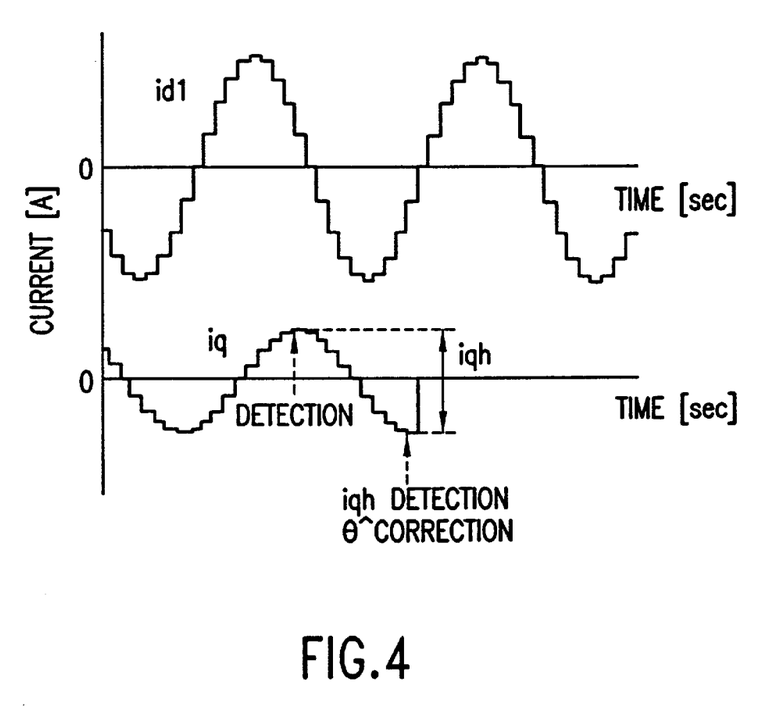
FIG. 4 is a diagram showing waveforms in a process of correcting a phase by detecting the quantity of a change generated in a half cycle of the response current iq' and using the detected quantity of the change in the correction.

In the method of inferring the position of a magnetic pole whereby the peak value of the current iq' is detected as described above, the value of iqh may be so small that the inference accuracy is affected. In such a case, an iq' change quantity detecting unit 10 is provided as shown in FIG. 3. In the iq' change quantity detecting unit 10, the value of iq' is detected for each half period of a current signal id1* for inference use as shown in FIG. 4. The change quantity in a half period is taken as iqh. In particular, if the phase timing of detection for each half period is set to coincide with a peak and an inverse peak of the response current iq', the value iqh can be detected with ease and with a high degree of accuracy.

In the technique described above, the phase of the response current iq' with respect to the current signal id1* is measured and the value iqh is detected with timing with which the measured phase reaches a predetermined value. It should be noted that, by setting the period of the current signal id1* for inference use at a multiple of the sampling period of the motor control apparatus, the predetermined value of the phase of the timing can be detected by merely counting the number of sampling periods.

Figure 5:
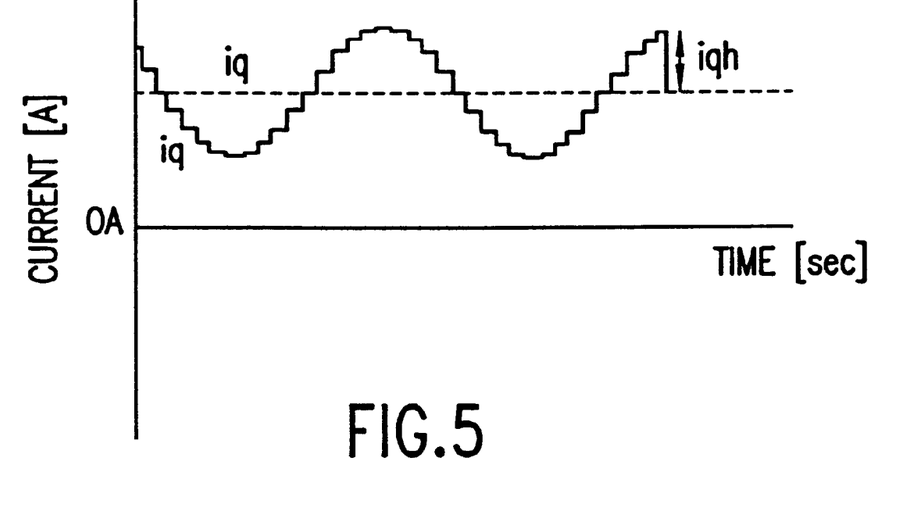
FIG. 5 is a diagram showing the waveform of the response current iq' in an operation to drive the synchronous motor.

In addition, in a case wherein a current control system is provided for each of the d' and q' axes of the control coordinate system as shown in FIGS. 1 and 3, the detected value of the current iq' includes a component generated by the current signal id1* for inference use and a component generated by the current command iq* for synchronous motor control use. In such a case, the current command iq* is a direct-current signal or a signal with a vvery low frequency as shown in FIG. 5, giving rise to a big difference in frequency from the current signal id1* for inference use which has a very high frequency of several hundred Hz. Thus, by finding a detected value iqh on the basis of a result of subtracting the value of the current command iq* from the response current iq', a component generated by the application of the current signal id1* for inference use can be extracted from the response current iq' with ease.

What has been described above is a first embodiment of the present invention wherein, by detecting the value iqh with predetermined phase timing of the current iq' with respect to the current signal id1* for inference use, the position of the magnetic pole can be inferred with ease and with a high degree of accuracy.

Figure 6:
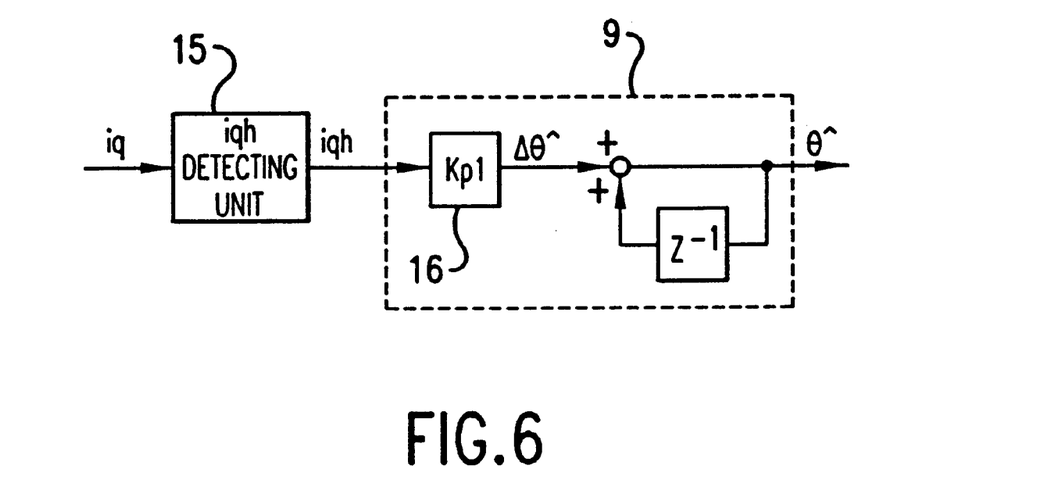
FIG. 6 is a block diagram showing a first typical configuration of a magnetic pole position inferring unit.

The following is a description of the magnetic pole position inferring unit 9 shown in FIGS. 1 and 3, in a second embodiment of the present invention. FIG. 6 is a block diagram showing a first typical configuration of the magnetic pole position inferring unit 9. As shown in FIG. 6, an iqh detecting unit 15 is implemented by either the iq' peak detecting unit 8 shown in FIG. 1 or the iq' change quantity detecting unit 10 shown in FIG. 3.

First of all, the description begins with a case in which the gain characteristic with respect to the position error $\Delta\theta$ of the transfer function from the current command id* to the detected value of the current iq' shown in FIG. 16 can be approximated by a linear function. In this case, an inferred value $\Delta\hat\theta$ of the position error can be found with ease by multiplying the detected value iqh by a predetermined gain Kp1 by means of a multiplier unit 16 as shown in FIG. 6. Then, by correcting the inferred value $\hat\theta$ of the position of the magnetic pole by $\Delta\hat\theta$ obtained in this way, an inferred value of the current position of the magnetic pole can be found.

By carrying out the processing only once, however, approximation and parameter errors may make it impossible to obtain an accurate inferred value $\Delta\hat\theta$ of the position error so that the amplitude of the response current iq' does not become 0 even after the correction of inferred value $\hat\theta$. In such a case, by repeating the multiplication and the correction of the inferred value $\hat\theta$, the amplitude of the response current iq' can be brought to 0, that is, it is possible to make the inferred value $\hat\theta$ coincide with the position $\theta$ of the magnetic pole.

In a method of inferring the position of a magnetic pole provided by the present invention as described above, an inferred value $\Delta\hat\theta$ of the position error can be found with ease by multiplication carried out once and, by further repeating the multiplication and the correction of the inferred value $\hat\theta$ of the position of the magnetic pole, it is possible to infer an accurate position which is not affected by parameter errors.

In this case, in the configuration of the magnetic pole position inferring unit 9 shown in FIG. 6, an inference operation is carried out only once in one period of the current signal id1* for inference use. As a result, the magnitude of the position error $\Delta\theta$ increases as the speed of the synchronous motor rises. In order to cope with such a problem, the magnetic pole position inferring unit 9 is designed into a configuration shown in FIG. 7.

Figure 7:
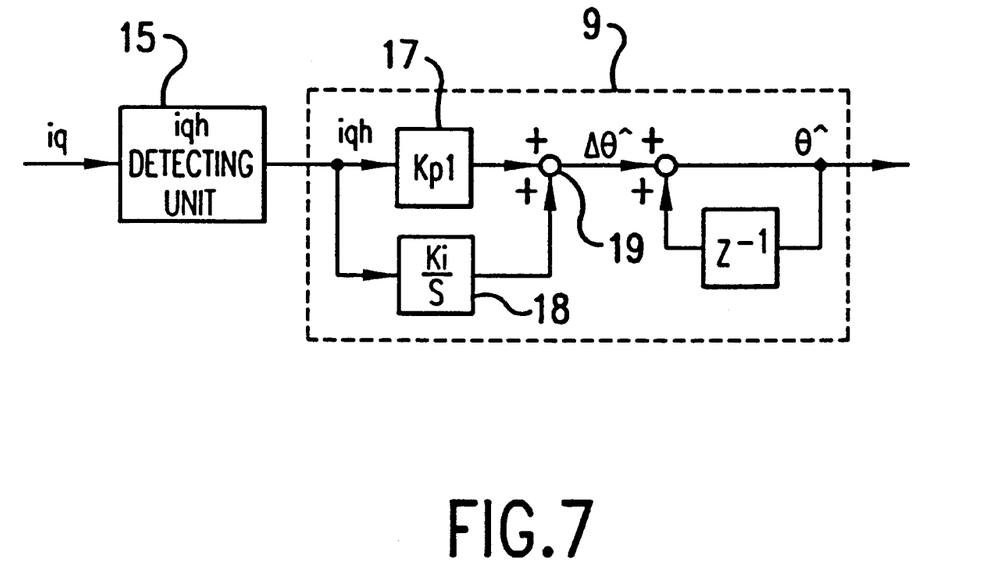
FIG. 7 is a block diagram showing a second typical configuration of the magnetic pole position inferring unit.

FIG. 7 is a block diagram showing a second typical configuration of the magnetic pole position inferring unit 9. In the configuration shown in FIG. 7, the detected value iqh is multiplied by a gain Kp2 by means of a proportional processing unit 17 and undergoes processing by an integral processing unit 18. A product output by the proportional processing unit 17 is then added to a result of the processing output by the integral processing unit 18 by an adder 19 to produce a result of addition as an inferred value $\Delta\hat\theta$ of the position error. Then, the position of the magnetic pole $\theta$ is inferred by correcting the inferred value $\hat\theta$ of the position of the magnetic pole by using the inferred value $\Delta\hat\theta$ of the position error.

In the configuration shown in FIG. 7, the inferred value $\hat\theta$ of the position of the magnetic pole is corrected by the integral processing unit 18 for each sampling so that the detected value iqh becomes 0. As a result, the position of the magnetic pole can be inferred even if the speed of the synchronous motor increases. In addition, the current signal id1* for inference use can be reduced in magnitude in comparison with the configuration shown in FIG. 6.

Next, a 3rd embodiment provided by the present invention is explained.

Figure 8:
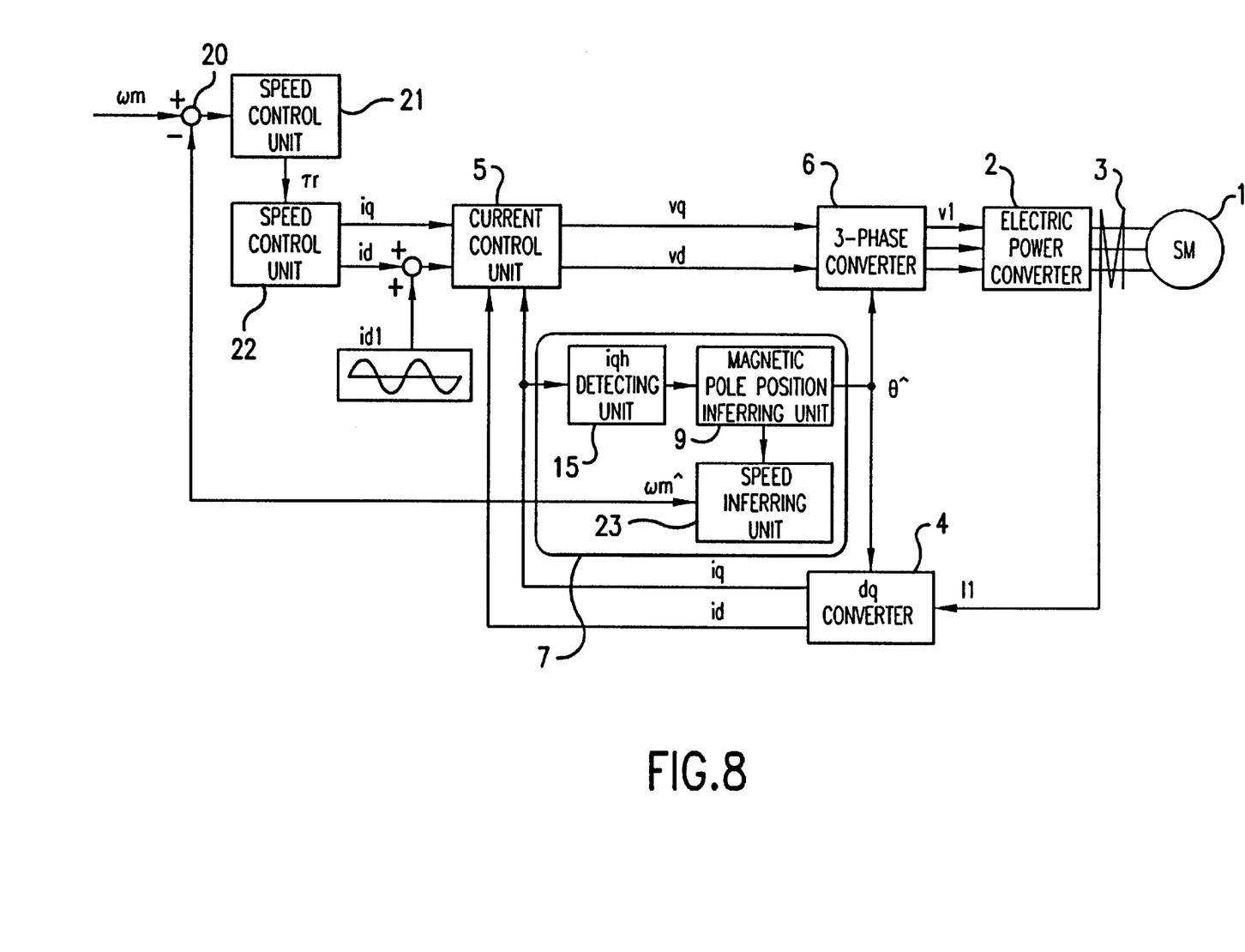
FIG. 8 is a block diagram showing a configuration of an application of a magnetic pole position inferring means to a system having a speed control unit.

FIG. 8 is a block diagram showing a configuration of an application of the magnetic pole position inferring means 9 to a system having a speed control unit. In the configuration shown in FIG. 8, an inferred value $\hat\omega m$ of the synchronous motor speed and a speed command $\omega m^*$ are supplied to a comparator 20 for finding a deviation between them which is fed to a speed control unit 21 for computing a torque command $\tau r^*$. The torque command $\tau r^*$ is further supplied to a torque control unit 22 for generating the current commands id* and iq* in the directions of the d and q axes respectively.

Figure 9:
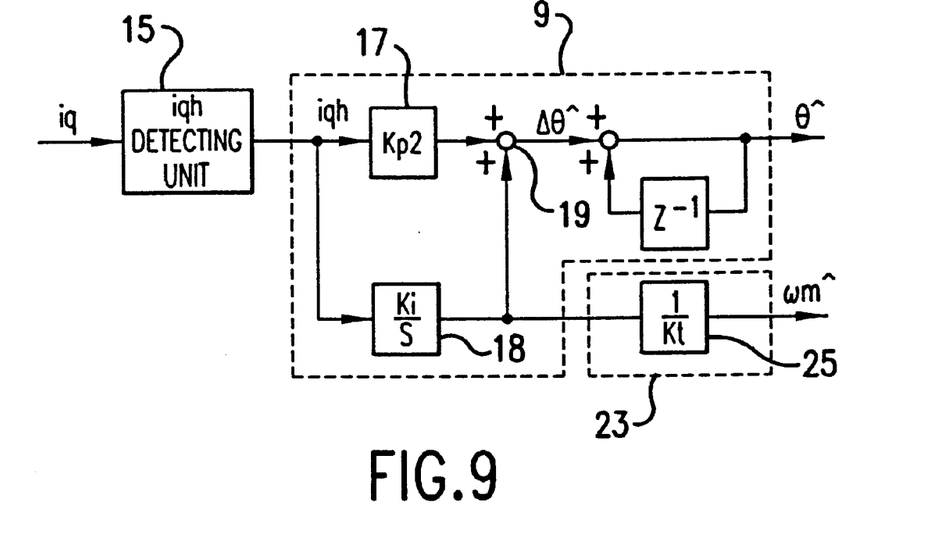
FIG. 9 is a block diagram showing a typical configuration of a speed inferring unit.

The magnetic pole position inferring unit 9 employed in the motor control apparatus shown in FIG. 8 has a configuration shown in FIG. 7. By designing the magnetic pole position inferring unit 9 into a configuration shown in FIG. 7, the speed inferring unit 23 employed in the motor control apparatus shown in FIG. 8 has a configuration shown in FIG. 9. This is because, since the output of an integrator 18 employed in the speed inferring unit 23 shown in FIG. 9 is a value including information on the speed of the synchronous motor, by dividing the output by a constant Kt by means of a divider 25, the inferred value $\hat\omega m$ of the speed can be obtained.

By providing a speed inferring unit 23 for dividing the output of the integrator 18 employed in the magnetic pole position inferring unit 9 as described above, the speed of the synchronous motor can be inferred, making it possible to build a speed control system like the one shown in FIG. 8.

Figure 10:
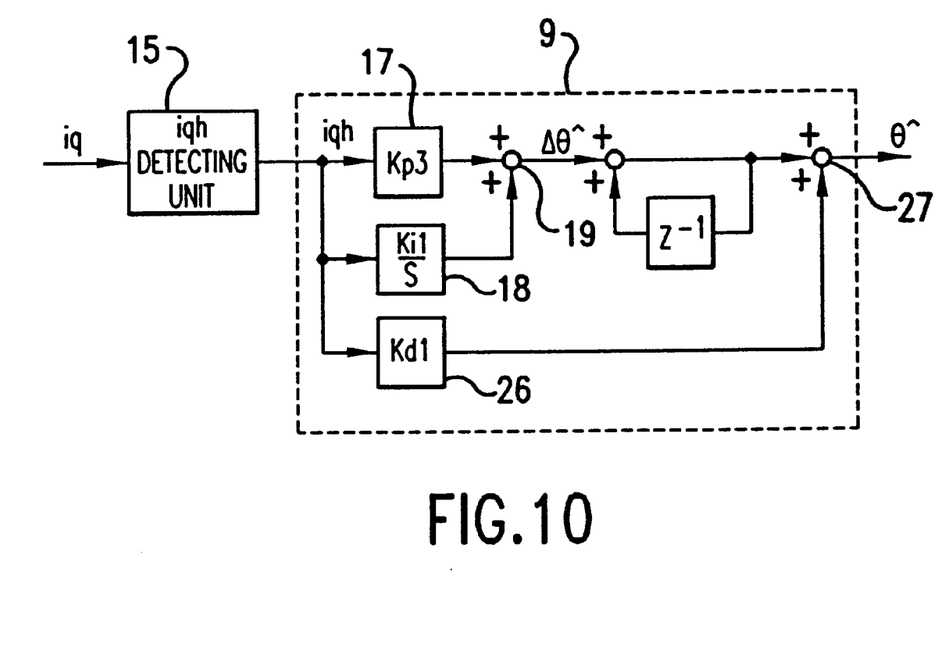
FIG. 10 is a block diagram showing a third typical configuration of the magnetic pole position inferring unit.
Figure 11:
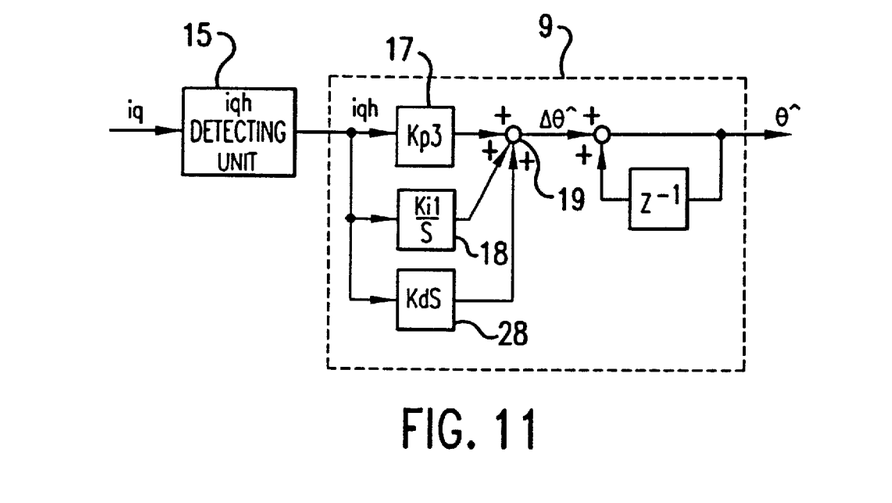
FIG. 11 is a block diagram showing an equivalent circuit of the third typical configuration of the magnetic pole position inferring unit.

FIG. 10 is a block diagram showing a third typical configuration of the magnetic pole position inferring unit 9. It should be noted that, as shown in the figure, by multiplying the detected value iqh by a gain Kd1 by means of a multiplier 26 and adding the product output by the multiplier 26 to the inferred value θ^ by an adder 27, the magnetic pole position inferring unit 9 is capable of providing the same effect as an equivalent configuration of the magnetic pole position inferring unit 9 shown in FIG. 11 wherein a differentiator 28 is added. Thus, the time it takes to converge the inferred value iqh to a 0 can be reduced.

Next, a 4th embodiment of the present invention is explained.

According to the methods of inferring the position of a magnetic pole explained so far, since the position is iD inferred by converging the value of sin (2Δθ) included in the numerator of the transfer function expressed by Eq. (6) to a 0, the range that can be inferred is ±45 degrees. For this reason, it is not possible to obtain information on even an approximate position at a time an initial position is inferred when the synchronous motor is started. It is thus necessary to provide an axis determining means for forming a judgment as to whether the inferred value θ^ was found for the d or q axis after the inference of the position described earlier and to further provide a polarity determining means for forming a judgment as to whether the d axis determined by the axis determining means is oriented in the N or S pole direction after the judgment formed by the axis determining means.

Figure 12:
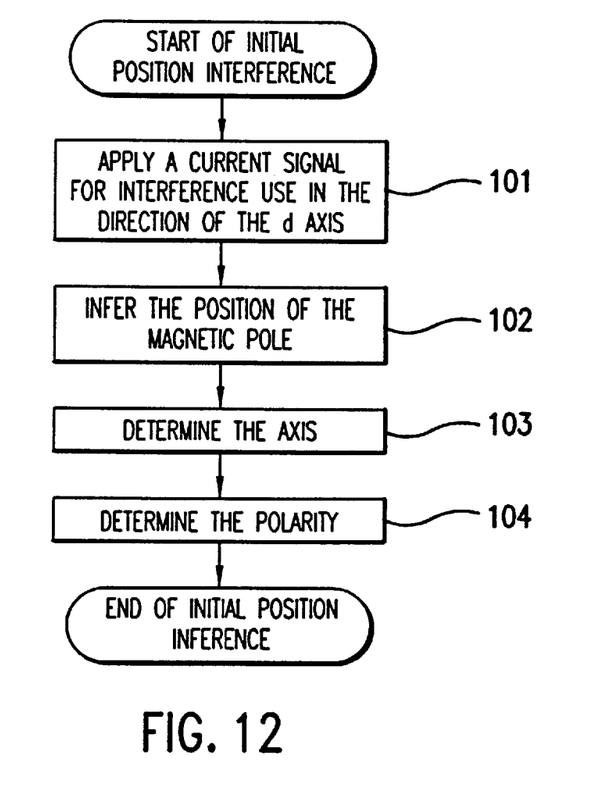
FIG. 12 is a flowchart representing processing carried out by an initial position inferring unit.

Next, processing carried out by an initial position inferring means 30 employed in the motor control apparatus shown in FIG. 1 is explained by referring to a flowchart shown in FIG. 12.

As shown in the figure, the flowchart begins with a step 101 at which the current signal id1* for inference use in the direction of the d axis is applied. The processing flow then goes on to a step 102 at which the inferred value θ^ of the position of the magnetic pole is computed by using the method of inferring the position of a magnetic pole described earlier.

Then, the flow of processing proceeds to a step 103 at which axis determination processing is carried out. If the inferred value θ^ is determined to be a value in the direction of the d axis, θ^ is saved as it is. If the inferred value θ^ is determined to be a value in the direction of the q axis, on the other hand, θ^ is corrected by +90 or −90 degrees into a value in the direction of the d axis. The axis determination method adopted by the axis determining means will be described in detail later.

Subsequently, the flow of processing continues to a step 104 from the step 103 at which the inferred value θ^ may have been corrected by +90 or −90 degrees into a value in the direction of the d axis. At the step 104, polarity determination processing is carried out to form a judgment as to whether the accurate position of the magnetic pole of the synchronous motor is θ^ or θ^+180 degrees.

As a polarity determination method, a generally known technique utilizing a magnetic saturation characteristic can be adopted.

By carrying out the axis determination processing to be followed by the polarity determination processing in the initial position inferring unit 30 as described above, even at a start time of the synchronous motor at which the position of the magnetic pole is not known at all, the position of the magnetic pole can be inferred with a high degree of accuracy.

Next, the axis determination method is explained in detail.

Figure 13A:
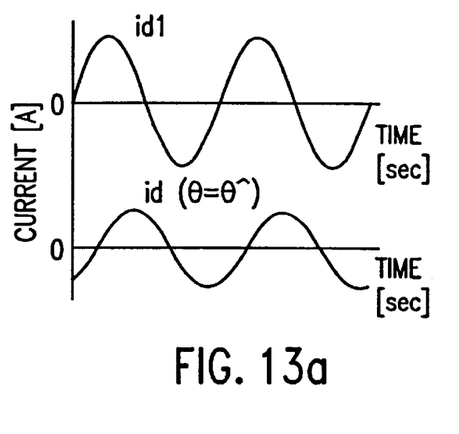
FIG. 13 is a diagram illustrating typical waveforms showing differences in current response between the d axis (wherein θ=θ^) and a q axis (wherein θ=θ^±90 degrees)
Figure 13B:
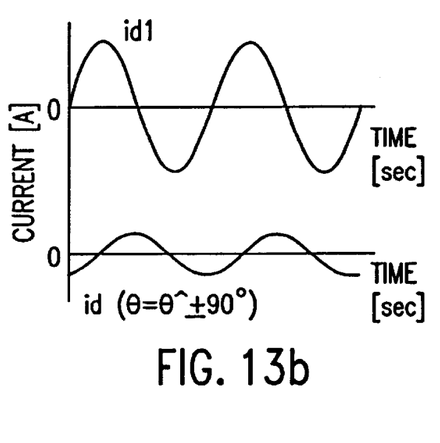

In general, a salient pole synchronous motor has a characteristic exhibiting that the inductance Ld in the direction of the d axis is not equal to the inductance Lq in the direction of the q axis. Thus, in the case of Ld<Lq, for example, the amplitude of a response current id' in the direction of the d axis where θ=θ^ is different from the amplitude of a response current iq' in the direction of the q axis where θ=θ^±90 degrees even for the same applied current command as shown in FIG. 13. The amplitudes of the response currents id' and iq' are different from each other because there is a difference in response time constant between current control systems of the d and q axes which can be attributed to the difference in value between inductances Ld and Lq. As a result, it is possible to form a judgment as to whether an inferred value θ^ is a value in the direction of the d or q axis by applying a signal for inference use and detecting the amplitude of a response current.

It should be noted that, since the difference in phase lag between the response currents id' and iq' in the directions of the d and q axes respectively is too small to be detected, the peak value of the response current, that is the amplitude of the response current, is selected as a quantity to be detected in the axis determination processing.

Figure 14:
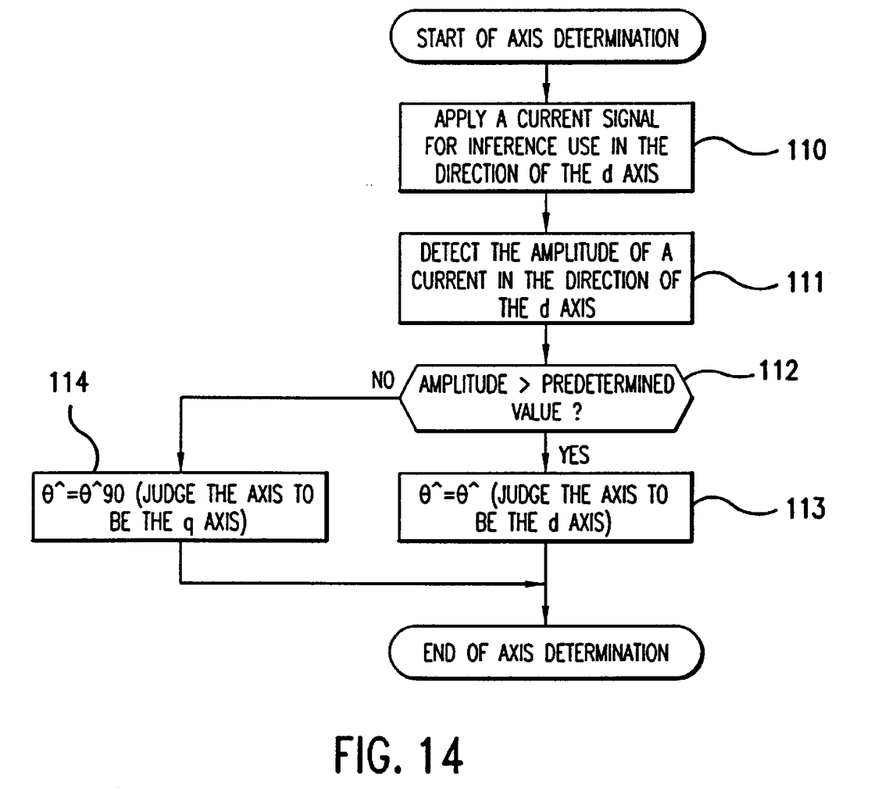
FIG. 14 is a flowchart representing a processing procedure of an axis determining means.

Next, a procedure of the axis determination processing is explained by referring to a flowchart shown in FIG. 14.

As shown in the figure, the flowchart begins with a step 110 at which the current signal id1* for axis determination use in the direction of the d axis is applied. It should be noted that the current signal id1* for axis determination use in the direction of the d axis is different from the current signal id1* for inference use in the direction of the d axis described earlier. The flow of processing then goes on to a step 111 to detect the amplitude of a current id' in the direction of the d axis which flows in response to the application of the current signal id1*. Since the response current id' is the same current as that resulting from the application of the current signal id1* for inference of the position of the magnetic pole, the response current id' can be detected at the same time as the inference of the position of the magnetic pole. In addition, the amplitude of the response current id' can be detected in the same way as the technique of detecting the peak of the response current iq' in the direction of the q axis or the iq' change quantity detection method explained earlier.

Then, the flow of processing proceeds to a step 112 to form a judgment as to whether the amplitude of the detected response current id' is larger or smaller than a predetermined threshold value. As described above, it is assumed that the inductance Ld in the direction of the d axis is smaller than the inductance Lq in the direction of the q axis (Ld<Lq). Thus, an outcome of the judgment formed at the step 112 showing that the amplitude of the detected response current id' is larger than the predetermined threshold value indicates that the response of the current control system is fast, hence implying a small inductance which is Ld in this case. Thus, the detected response current id' is judged to be a value in the direction of the d axis in which case the flow of processing continues to a step 113 to determine that the inferred value θ^ of the position of the magnetic pole is indeed a value in the direction of the d axis.

On the other hand, an outcome of the judgment formed at the step 112 showing that the amplitude of the detected response current id' is smaller than the predetermined threshold value indicates that the response of the current control system is slow, hence implying a large inductance which is Lq in this case. Thus, the detected response current id' is judged to be a value in the direction of the q axis in which case the flow of processing continues to a step 114 to determine that the inferred value θ^ of the position of the magnetic pole is actually a value in the direction of the q axis. In this case, the inferred value θ^ is corrected by +90 degrees or −90 degrees to a value in the direction of the d axis.

As described above, in the axis determination processing, it is possible to form a judgment as to whether the inferred value θ^ of the position of the magnetic pole is a value in the direction of the d or q axis by detecting the amplitude of a current flowing in response to a current signal for inference of the position of a magnetic pole which is applied as a current signal for axis determination.

Finally, a fifth embodiment of the present invention is described.

Figure 15:
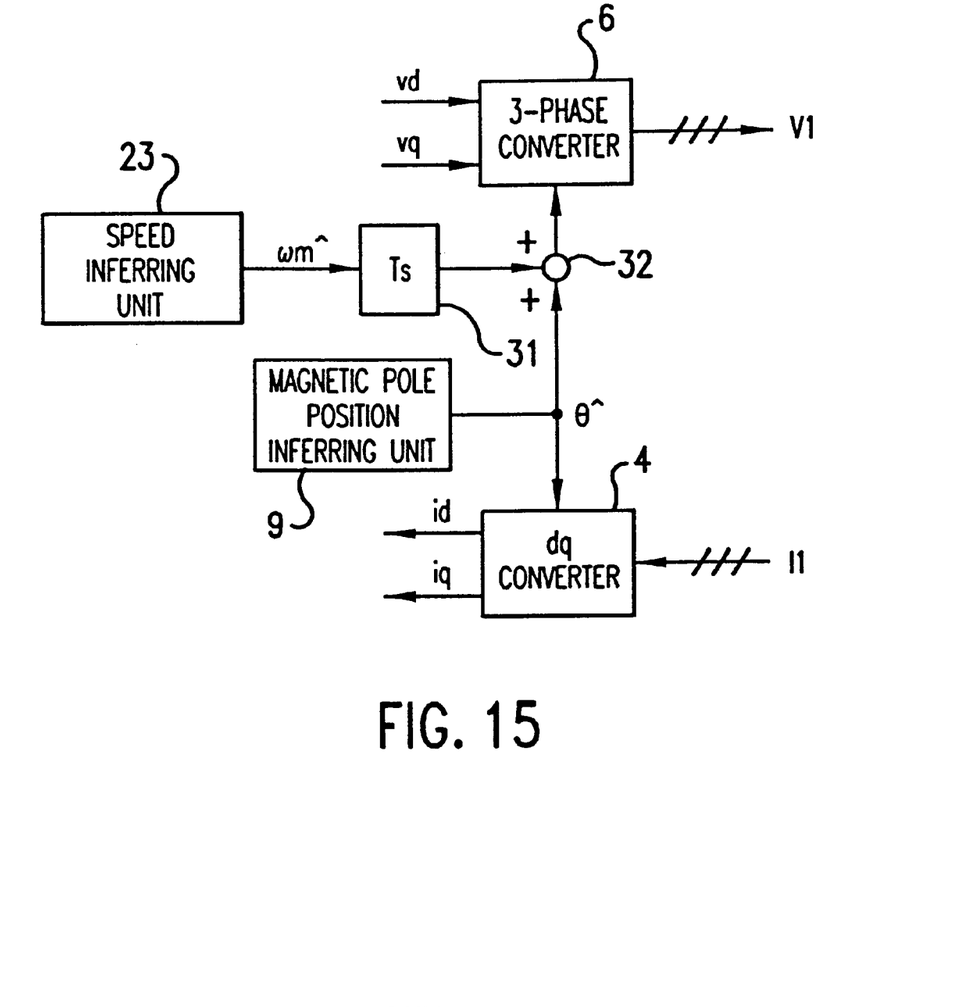
FIG. 15 is a block diagram showing a phase correcting technique adopted during rotation of the synchronous motor.

FIG. 15 is a block diagram showing a phase correcting technique adopted during rotation of the synchronous motor. In general, in the case of a digital motor control apparatus, as the speed of the synchronous motor rises, it becomes necessary to take the phase lag due to sampling into consideration. As shown in the figure, an inferred value of the phase used in the dq converter 4 is corrected into a phase used in the 3-phase converter 6 by adding a product to the inferred value of the phase by means of an adder 32. The product results from multiplication of an inferred synchronous motor speed ωm^ obtained by a speed inferring unit 23 by a constant Ts representing the sampling carried out by a multiplier 31.

In the scheme described above, the stability of the control system can be assured even if the speed of the synchronous motor rises.

Preferred embodiments of the present invention have been described above. The description of the embodiments is focused on a method for inferring the position of a magnetic pole of a synchronous motor whereby a signal for inference use is applied as a current command in the direction of the d axis and a current generated as a response to the command in the direction of the q axis is detected. It should be noted that the method can also be implemented by applying a signal for inference use as a current command in the direction of the q axis and detecting a current generated as a response to the command in the direction of the d axis. In addition, voltages can also be used instead of the currents.

Figure 19:
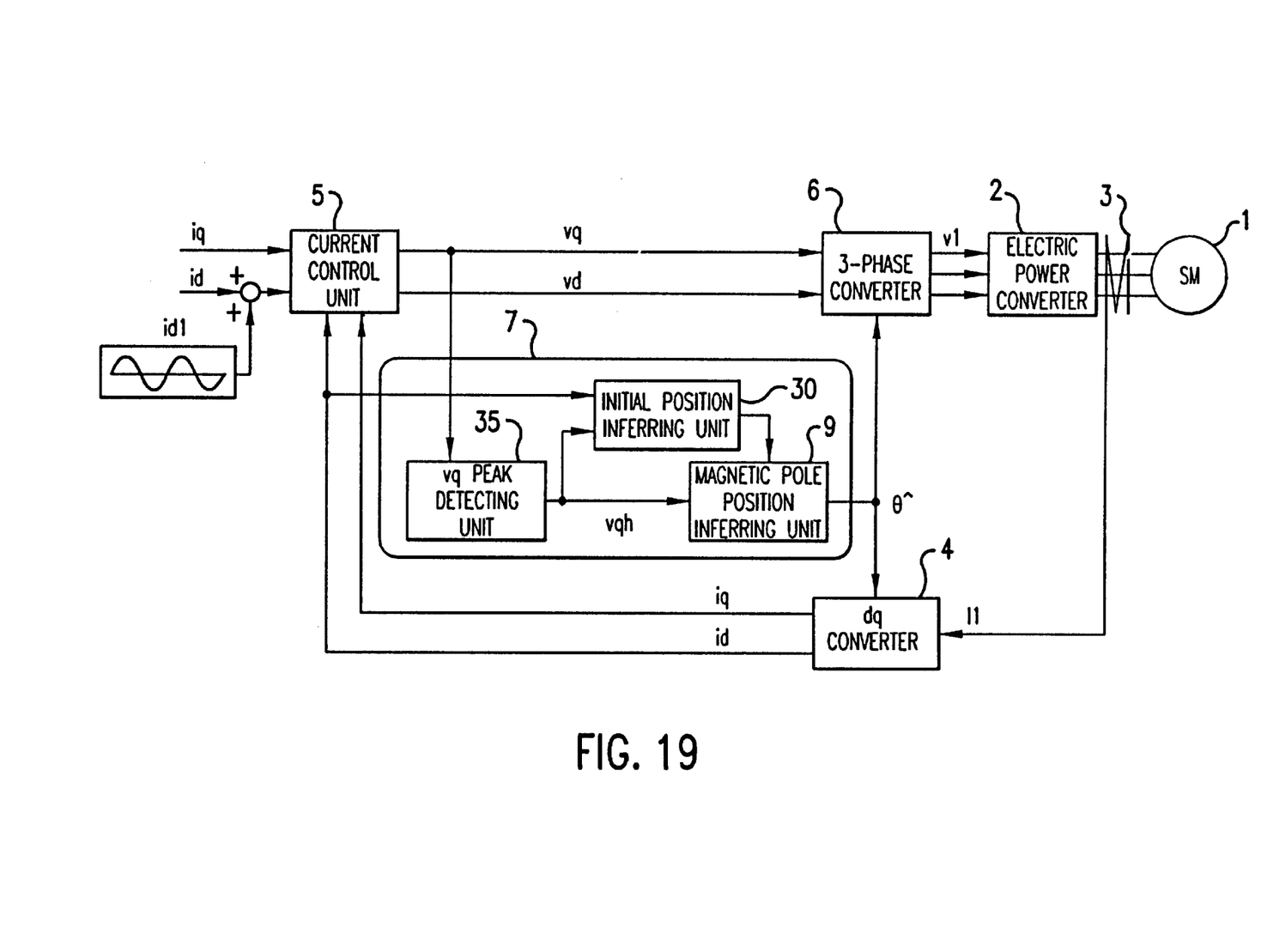
FIG. 19 is a block diagram showing the configuration of a system for inferring a position with a voltage taken as an input.

FIG. 19 is a block diagram the configuration of a system for inferring the position of a magnetic pole of a synchronous motor with voltages used as quantities for the inference.

When voltages are used for inferring the position of a magnetic pole of a synchronous motor, a peak value vgh of a voltage command vq* is detected by a vq* peak detecting unit 35 and supplied to a magnetic pole position inferring unit 9 as an input to processing to compute an inferred value θ^ of the position of the magnetic pole. The configuration of the magnetic pole position inferring unit 9 can be any one of the configurations shown in FIGS. 6, 7, 9, 10 or 11.

According to the present invention, the position of a magnetic pole of a synchronous motor can be inferred by using a simple method and with a high degree of accuracy by detecting a current flowing in the direction of one of two orthogonal axes in a control coordinate system in response to a current signal for inference use applied in the direction of the other axis at a predetermined phase and by carrying out multiplication.

What is claimed is:

1. A motor control apparatus having a magnetic pole position inferring means for inferring the position of a magnetic pole of a synchronous motor by applying one of an AC current signal for inference use and an AC voltage signal for inference use in the direction of one of two mutually perpendicular axes of an orthogonal axis coordinate system and detecting a respective one of a current and a voltage in the direction of the other of said two mutually perpendicular axes wherein said magnetic pole position inferring means corrects a set value of the position of said magnetic pole in accordance with a result of carrying out at least integral processing on said respective one of said current and said voltage in the direction of the other of said two mutually perpendicular axes.

2. A motor control apparatus having a magnetic pole position inferring means for inferring the position of a magnetic pole of a synchronous motor by applying one of an AC current signal for inference use and an AC voltage signal for inference use in the direction of one of two mutually perpendicular axes of an orthogonal axis coordinate system and detecting a respective one of a current and a voltage in the direction of the other of said two mutually perpendicular axes wherein said magnetic pole position inferring means corrects a set value of the position of said magnetic pole so that said respective one of said current and said voltage in the direction of the other of said two mutually perpendicular axes may become a zero.

* * * * *